(12) United States Patent
Carullo et al.

(10) Patent No.: US 7,083,152 B2
(45) Date of Patent: Aug. 1, 2006

(54) METHOD AND APPARATUS FOR RESTRAINING A DATA CABLE

(75) Inventors: Thomas J. Carullo, Marlton, NJ (US); Art Willers, Delran, NJ (US)

(73) Assignee: Computer Network Technology Corporation, Minneapolis, MN (US)

( * ) Notice: Subject to any disclaimer, the term of this patent is extended or adjusted under 35 U.S.C. 154(b) by 0 days.

(21) Appl. No.: 10/298,646

(22) Filed: Nov. 19, 2002

(65) Prior Publication Data

US 2004/0129842 A1    Jul. 8, 2004

Related U.S. Application Data

(60) Provisional application No. 60/424,334, filed on Nov. 7, 2002.

(51) Int. Cl.
*F16L 3/08* (2006.01)

(52) U.S. Cl. .......................................... 248/65; 248/70

(58) Field of Classification Search .................. 248/65, 248/70, 74.3, 49, 542, 543, 916; 24/16 PB, 24/17 AB, 30 SP, 17 A
See application file for complete search history.

(56) References Cited

U.S. PATENT DOCUMENTS

| | | | | |
|---|---|---|---|---|
| 3,632,071 | A * | 1/1972 | Cameron et al. | 248/74.3 |
| 3,913,876 | A * | 10/1975 | McSherry | 248/74.3 |
| D280,597 | S * | 9/1985 | Fortsch | D8/396 |
| 4,899,963 | A * | 2/1990 | Murphy | 248/65 |
| 5,040,751 | A * | 8/1991 | Holub | 248/62 |
| 5,042,114 | A * | 8/1991 | Parrish | 24/16 PB |
| 5,320,322 | A * | 6/1994 | Williams | 248/514 |
| 6,394,399 | B1 * | 5/2002 | Koziol | 248/74.3 |
| 6,499,199 | B1 * | 12/2002 | Frazier | 24/306 |
| 6,533,226 | B1 * | 3/2003 | Geiger | 248/74.3 |
| D477,212 | S * | 7/2003 | Ellery | D8/380 |

* cited by examiner

*Primary Examiner*—Robert P. Olszewski
*Assistant Examiner*—A. Joseph Wujciak
(74) *Attorney, Agent, or Firm*—Beck & Tysver, P.L.L.C.

(57) ABSTRACT

A method and apparatus includes a retainment face, which with a rear boundary define a channel. The channel has a first and second opening that enable a tie to be threaded through the channel and around a data cable to secure it in place.

8 Claims, 4 Drawing Sheets

METHOD AND APPARATUS FOR RESTRAINING A DATA CABLE

PRIORITY

This application claims priority to the provisional U.S. patent application entitled, A Method and Apparatus for Restraining a Data Cable, filed Nov. 7, 2002, having a Ser. No. 60/424,334, the disclosure of which is hereby incorporated by reference.

FIELD OF THE INVENTION

The present invention relates generally to a method and apparatus for restraining a cable. More particularly, the present invention relates to securing large data cables within an electronic structure in a manner so as to not damage the cable.

BACKGROUND OF THE INVENTION

Organization of data cables has been a constant frustration since the arrival of computers. Once the cables are connected to the endpoint of their elements, the organization and protection of the cable becomes a separate problem in itself. Prior art devices include clam shells that contain individual runners for the cable to lie. The disadvantage with the clam shell is that the runners are not suitable for a large data cable that holds a significant number of optical fibers. Furthermore, the devices are difficult to work with in confined areas. These devices also tend to require an extra set of hands in order to put them in place.

Other devices include circular restraints that detach from one end. To restrain the cable, a circular restraint with a diameter large enough to accommodate the cable is chosen. The device is then secured to an enclosure with a self-adhesive. The disadvantage with such a configuration is the overall strength of the restraint, which can become loose or dislodged when a torque is applied to the data cable. For example, once the data cables are initially installed, the cables need to be moved or adjusted from the original locations. In doing this, the cables are pulled or torqued in a number of different directions. With the prior art solutions to the problem, the restraints can easily become dislodged and damaged.

Another disadvantage is that the circular restraints are secured with self-adhesive. The self-adhesive does not provide a sufficient means to secure the cable. As in the previous example, if the cables are pulled or torqued, the self-adhesive does not provide enough of a securing mechanism to restrain the cable from being moved from the secured location.

The prior art solutions also do not allow a user to efficiently place a clamping device in an enclosure with the minimal amount of effort and personnel. In an area where equipment is already existing, the open area available to the technician is usually confined. In these areas, it is difficult to use the prior art devices because it usually takes an extra set of hands to restrain the cable and the install the device properly. This is especially true with the clam shell type devices.

Accordingly, it is desirable to provide a clamping device that is able to restrain various diameters of data cable with ease and efficiency. The clamping device provides a retainment face, which defines one side of a channel. The channel serves as a pathway for a tie to enclose a data cable and restrain it to the clamping device.

SUMMARY OF THE INVENTION

The present invention provides a method and apparatus to enable a user to restrain a data cable within an enclosure.

The present invention also provides a method and apparatus for allowing a user to easily and efficiently secure a data cable. Furthermore, the apparatus can be secured in its original location even when the cable is being subjected to various forces.

The above can be achieved through the use of a novel channel located within a clamping device to enable a tie to secure a data cable to a clamping device as herein disclosed. In accordance with one embodiment of the present invention, an apparatus for securing a cable includes a retainment face and a front and rear boundary that define a channel, wherein the channel includes and a first and second opening. The front boundary in this embodiment is defined by the retainment face.

The channel provides a passageway for a tie to be threaded from one opening to a second opening. The channel runs approximately the length of the retainment face. To enable the tie to be easily threaded through the channel, the rear boundary and the retainment face are shaped in approximately a concave manner.

Extending from the rear boundary of the channel is an extension. The extension has slots with recessed areas for fasteners. This extension enables the clamping device to be secured to an enclosure from where a data cable is entering or exiting. In order to effectively secure the clamping device to the enclosure, a lip extends from the rear boundary to prevent any radial motion.

In accordance with another embodiment of the present invention, a method is provided for securing a data cable. This alternate embodiment includes the steps of placing a clamping device around a portion of a cable, threading a tie through a first and second opening in a channel in the clamping device and securing the cable to the clamping device with the tie. A further step can be securing the device to a structure. One way to accomplish the step of securing is the use of fasteners.

In another aspect of the alternate embodiment, the channel is defined by a front and rear boundary. Both of the boundaries are shaped in approximately a concave manner. Extending from the rear boundary is an extension, which enables the clamping device to be secured to another device. The extension contains slots for the placement of fasteners. The slots also contain a recessed area for the fasteners to ensure that the clamping device stays fixed to the fasteners.

In another alternate embodiment, an apparatus for securing a data cable comprises means for placing a clamping device around a portion of a cable, means for providing a channel in the clamping device and means for securing the cable to the clamping device through a first and second opening in a channel.

The channel is defined by a front and rear boundary. Extending from the rear boundary is means for attaching the apparatus to a structure. The means for attaching, in this embodiment, is an extension extending perpendicularly from the rear boundary. The extension has fastener slots. To securely restrain the cable, the front and rear boundaries are concave shaped.

In another alternate embodiment of the present invention, an apparatus for securing an apparatus includes a concave surface, a channel that is defined on one side by the concave surface, wherein the channel includes a rear boundary that defines another boundary of the channel. The apparatus can further include an extension that extends outwardly from the rear boundary. Within the outward extension, a fastener slot is located to secure the apparatus. The slot can contain a recessed area for more securely retaining the fasteners. In another aspect of this alternate embodiment, the apparatus can be secured to a device with adhesive.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A preferred embodiment of the present invention provides a channel through which a tie is threaded. This ensures the securement of a data wire or cable to a clamping device.

Figure 1:
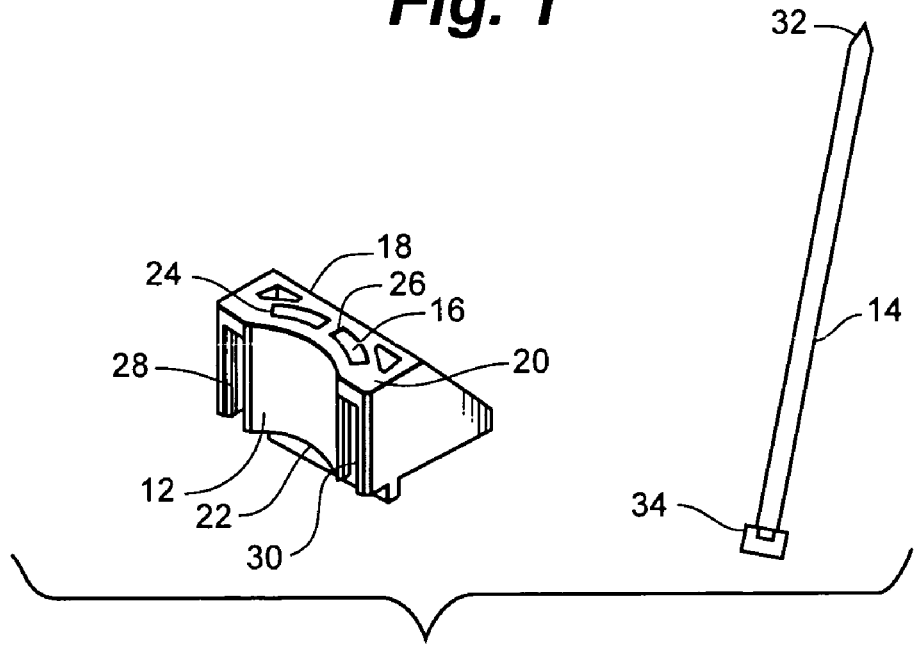
FIG. 1 is a front perspective view of the preferred embodiment.

A preferred embodiment of the present inventive apparatus and method is illustrated in FIG. 1. The clamping tool 10 includes a retainment face 12. A cable is placed against or in parallel with the retainment face 12 in order for it to be secured. In the preferred embodiment, the data cable is a multi-strand fiber optic cable. One of ordinary skill in the art recognizes that the clamping device 10 can also be used with other data cables such as copper. The invention is not limited to the configuration as detailed in the preferred embodiment.

The retainment face 12 serves as the location where the cable is placed and attached to the clamping device 10. The cable is held against the retainment face 12 with a tie 14. The tie in the present invention is a commercially available reusable plastic tie wrap. One of ordinary skill in the art recognizes that the invention is not limited to the use of the plastic tie wraps. The tie wraps can be wire, copper or steel, string, rope or any other tie that retains the cable to clamping device 10.

The retainment face 12 serves as one of the outer boundaries for the channel 16. The channel 16 is defined by the retainment face 12 and a rear boundary 18. The channel 16 is enclosed on both the top portion 20 and lower portion 22. The four-sided enclosure prevents the tie 14 from becoming detached from the clamping device 10.

In the preferred embodiment, the top boundary 18 includes eyelets 24, 26 to aid the user in threading the tie 14 through the channel 16. As a tie 14 is being threaded through the channel 16, the user can monitor its progress by looking through the eyelets 24, 26 to ensure that it passes without obstruction through the channel. The tie is passed through the channel 16 through a first 28 and second 30 openings. Either of the openings 28, 30 can serve as the entrance for the tie 14.

For example, a data cable is held against the retainment face 12. At the same time or prior to it, one-end 32 of the tie 14 is threaded through the first opening 28 of the channel 16 and out of the second opening 30 of the channel 16. Once the tie 14 is threaded through the channel 16, the tie ends 32, 34 are connected or secured. By connecting the ends of the tie 14, the cable is attached or secured to the clamping device 10. By incorporating the use of separate devices, i.e., clamping device 10 and tie 14, the cable is more securely restrained and less likely to move or become dislodged during movements of the cable.

The retainment face 12, in the preferred embodiment, is concave in shape to enable the clamping device 10 to hold the cable in place. The concave shape aids the clamping device in retaining the cable is place. Other shapes, such as a flat surface, can serve as the retainment face 12 but would not offer the same advantages. For example, a smooth retainment face 12 introduces variables into the system such as the movement of the cable along the retainment face 12. The concave shape along with the tie 14 prevent the cable from moving excessively along the retainment face 12. The use of a smooth surface does not have the same effect. In order to prevent movement along a smooth surface, the tie 14 needs to adjusted to almost a maximum retainment setting. However, the disadvantage with this is that the 14 tie could damage the data cable. One of ordinary skill on the art recognizes the endless amount of shapes for the retainment face 12. The preferred embodiment incorporates the concave shape for the reasons stated above.

The concave shape of the retainment face 12 cups the cable within its structure. In doing so, the cable is prevented from excessive lateral movement. The lateral movement is contained in that movement in the concave shape prevents the cable from shifting out of the clamping device. There is some movement within the clamping device. The amount or movement is calculated by taking the difference of the radii of the cable and retainment face 12. A difference resulting in a greater retainment face radius is the amount of space the cable is able to move in a lateral manner. However, this difference is compensated or held in check by having clamping devices with varying sizes of diameters.

Figure 2:
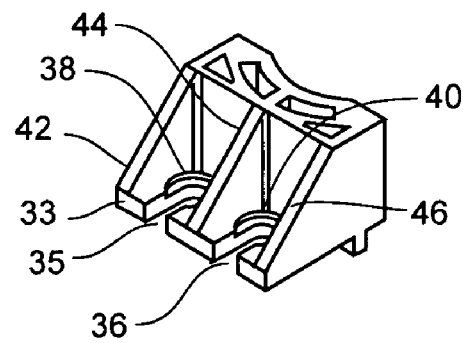
FIG. 2 is a rear perspective of the preferred embodiment.

FIG. 2 is a rear perspective of the preferred embodiment. This perspective illustrates what specific elements are used to attach it to a device or structure. The device in this case can be a electronic enclosure or housing. The clamping device 10 includes an extension 33, which projects perpendicularly from the rear boundary 18. The extension 33 has slots 35, 36, which enable fasteners to hold the clamping device 10 to the electronic enclosure. In the preferred embodiment, the slots 35, 36 also include recessed areas 38, 40 to accommodate the head of a fastener. The recessed areas 38, 40 of the slots 35, 36 prevent the clamping device 10 from becoming dislodged from the fasteners. The recessed areas are more applicable to a clamping device 10 comprised of a polymer. The composition of a polymer material is more apt to strain under a high torque event than metal. However, metal is not the material of choice due to its possible electrical conductivity of it with the data cable.

Additionally, the extension 33, in the preferred embodiment, contains frame supports 42, 44, 46. These supports 42, 44, 46 provide extra rigidity for the extension 33. Without the supports 42, 44, 46, the extension 33 is more apt to damage or weaken when the clamping device 10 is subjected to movements of the cable. With the supports 42, 44, 46, the extension is given additional torque resistance with both vertical and lateral movements.

Figure 3:
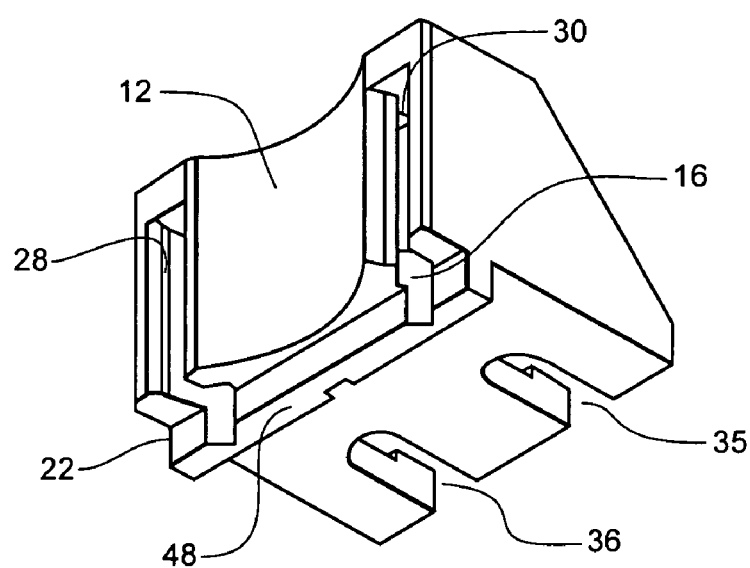
FIG. 3 is a bottom perspective of the preferred embodiment.

FIG. 3 is a bottom perspective of the preferred embodiment. The bottom perspective illustrates the use of a lip 48. The lip 48 aids the clamping device 10 in securing it to an enclosure or frame. For example, the clamping device 10 is secured in an enclosure at the edges of the frame. The lip 48 is located at the edge of the frame and placed in parallel with the frame components. The retainment face 12 and the openings 28, 30 of the channel 16 are placed away from the frame. The rest of the clamping device 10 rests on the frame and is secured to the frame through the slots 35, 36.

The lip 48 provides a two-prong benefit. The first is preventing lateral movement that would move the clamping device in the presence of a large enough torque. The second is preventing rear movement that would push the clamping device back into the enclosure and potentially damage its internal components.

Figure 5:
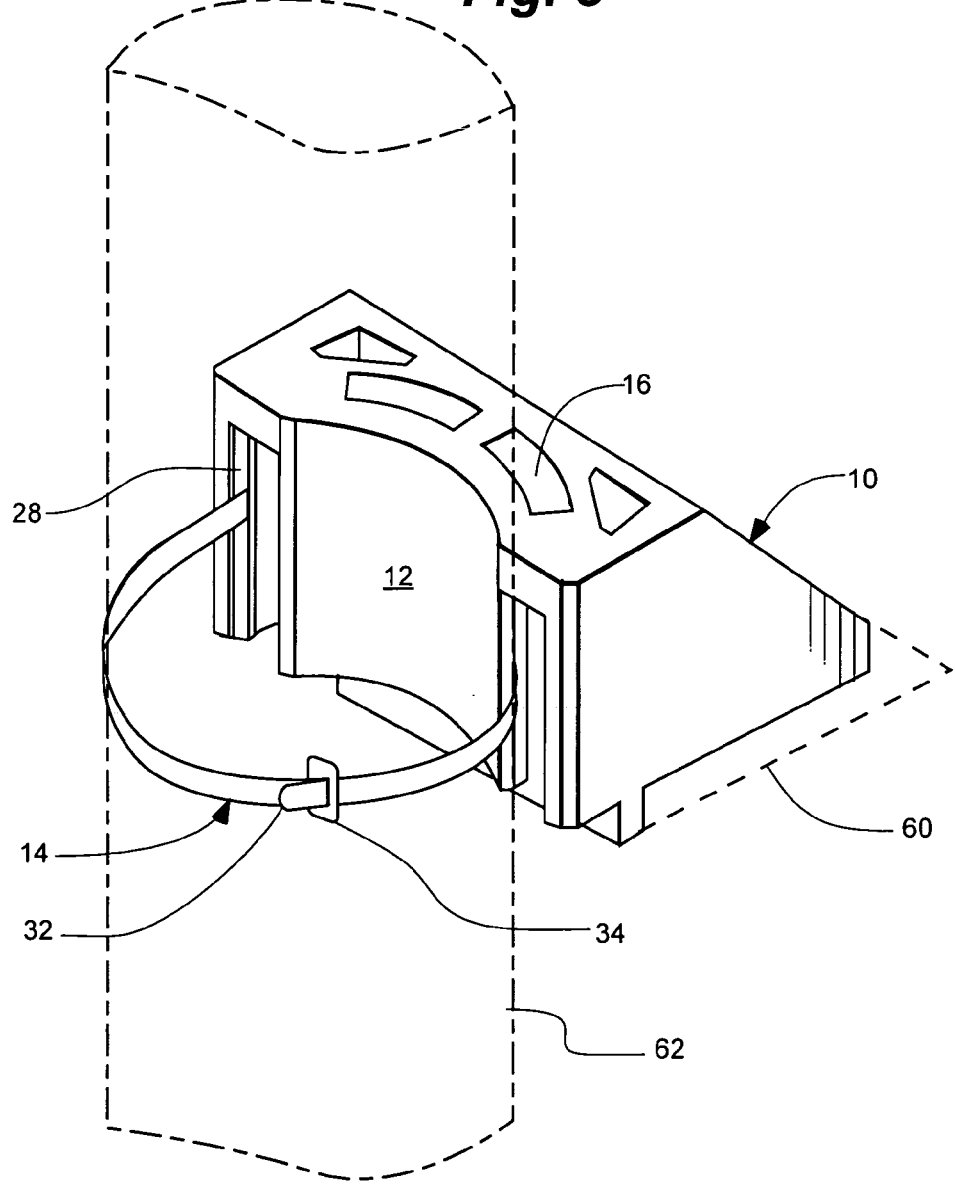
FIG. 5 is a front perspective view of the preferred embodiment of FIG. 1 shown attached to a reference structure indicated in phantom and an elongate article also shown in phantom.

FIG. 5 is a front perspective view of the damping device 10 attached to a reference structure 60 and attached to a cable 62 with a tie 14. As described above, the cable 62 is held against the retainment face 12 with the tie 14. The tie 14 is threaded through channel 16 and in through opening 28 and out of opening 30.

Figure 4:
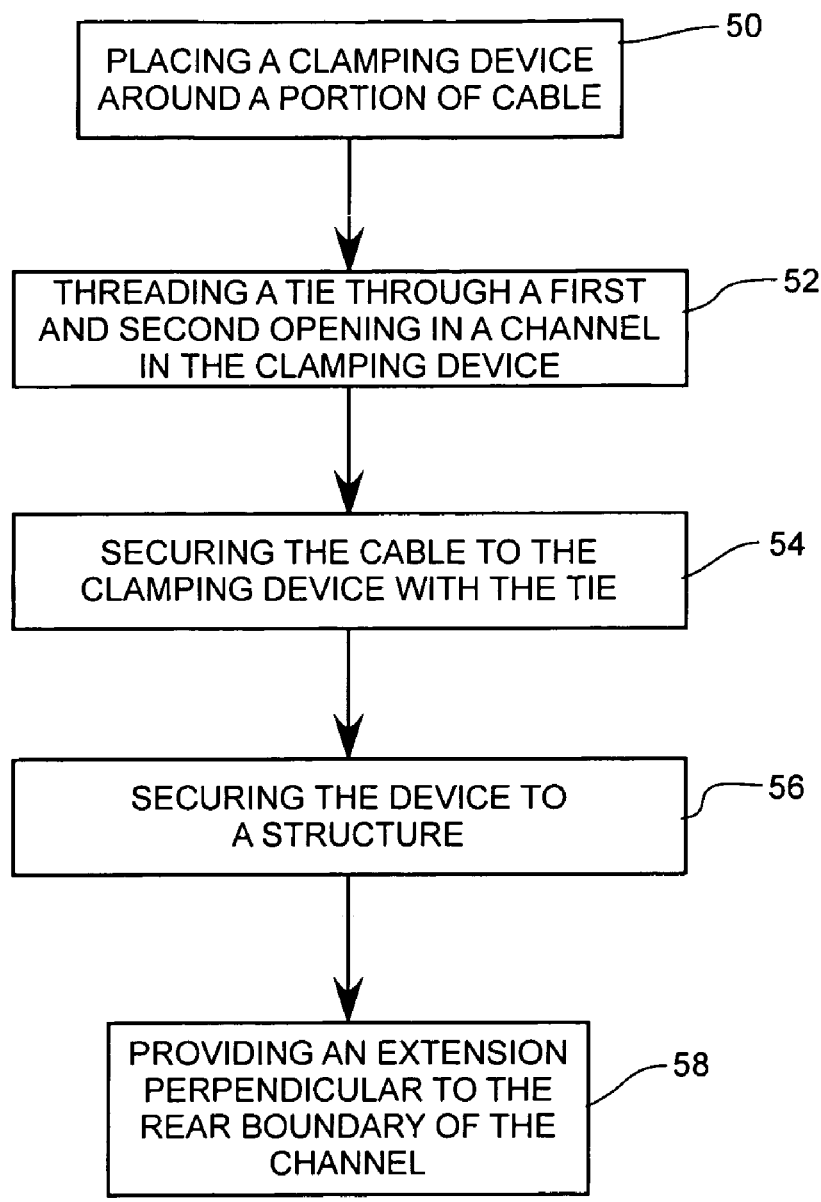
FIG. 4 is a flow diagram of an alternate embodiment of the present invention.

FIG. 4 is a flow diagram of an alternate embodiment of the present invention. The method includes the initial step 50 of placing a clamping device around a portion of a cable. In this step, the cable is placed against the retainment face. Once the cable is in place, the step 52 of threading a tie 14 through a first 28 and second 30 opening in a channel 16 of the clamping device is accomplished. The tie 14, in this step, is initially put in place so that cable is secured to the clamping device 10. After the tie 14 is threaded through the channel 16 and wrapped around the cable, the next step 54 is securing the cable to the clamping device 10 with the tie 14. In other words, the tie 14 is locked or secured at both ends so that the cable is secured to the clamping device 10.

Either prior to or after securing the cable to the clamping device 10, the next step 56 is attaching or securing the clamping device 10 to an enclosure. In this alternate embodiment, the device is an enclosure for a fiber optic switch. The clamping device 10 is secured to the frame of the electronic enclosure at the point of entry. The point of entry is usually at the base of the electronic enclosure. At this point, the cable is extending up from a raised computer floor. In securing the clamping device 10, this alternate embodiment includes the step 58 of providing an extension perpendicular to the rear boundary of the channel 16. The extension 33 projects perpendicularly from the rear boundary 18.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An article adapted to secure an axial elongate article to a reference structure with a tie, the article including:
    a wall including a retainment face, wherein the retainment face is adapted to interface with the elongate article, further wherein the retainment face forms an arcuate front boundary of a channel centered about a wall axis running generally parallel to the elongate article axis;
    a member attached to the wall, the member adapted to connect the wall to the reference structure;
    an arcuate rear boundary centered about the wall axis defining an arcuate channel between the front boundary and the rear boundary, the channel further defined by a top portion extending from the rear boundary to the front boundary, where the channel is terminated on each end with first and second openings such that the tie is adapted to enter the center of the channel through one of the first and second openings and exit the channel through the other of the first and second openings; and
    wherein the top portion of the channel includes a plurality of eyelets passing through the top portion and being in communication with the center of the channel.

2. The article of claim 1 wherein the retaining face is adapted to interface directly with the elongate article.

3. The article of claim 1 wherein the member includes an extension and frame supports.

4. The article of claim 1 wherein the member includes a lip.

5. The article of claim 1 wherein the retainment face has a concave shape.

6. The article of claim 1 wherein the retainment face includes an adhesive.

7. The article of claim 1 wherein the channel is generally smooth.

8. The article of claim 1 wherein the retainment face is generally smooth.

* * * * *